United States Patent
Cho et al.

(10) Patent No.: US 9,723,259 B2
(45) Date of Patent: Aug. 1, 2017

(54) APPARATUS AND METHOD FOR ADDING SYNCHRONIZATION INFORMATION TO AN AUXILIARY DATA SPACE IN A VIDEO SIGNAL AND SYNCHRONIZING A VIDEO

(75) Inventors: Suk Hee Cho, Daejeon (KR); Se Yoon Jeong, Daejeon (KR); Jong Ho Kim, Daejeon (KR); Sung Hoon Kim, Daejeon (KR); Jin Soo Choi, Daejeon (KR); Jin Woong Kim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 268 days.

(21) Appl. No.: 14/352,892

(22) PCT Filed: May 16, 2012

(86) PCT No.: PCT/KR2012/003837
§ 371 (c)(1),
(2), (4) Date: Apr. 18, 2014

(87) PCT Pub. No.: WO2013/058455
PCT Pub. Date: Apr. 25, 2013

(65) Prior Publication Data
US 2014/0333836 A1 Nov. 13, 2014

(30) Foreign Application Priority Data

Oct. 18, 2011 (KR) .................. 10-2011-0106544
Apr. 27, 2012 (KR) .................. 10-2012-0044609

(51) Int. Cl.
*H04N 7/00* (2011.01)
*H04N 7/088* (2006.01)
(Continued)

(52) U.S. Cl.
CPC .......... *H04N 7/088* (2013.01); *H04N 5/0675* (2013.01); *H04N 21/235* (2013.01);
(Continued)

(58) Field of Classification Search
CPC ....... H04N 7/88; H04N 5/0675; H04N 21/235
(Continued)

(56) References Cited

U.S. PATENT DOCUMENTS

| 5,841,941 A | * | 11/1998 | Morimoto | G11B 15/1875 386/300 |
| 2002/0078446 A1 | * | 6/2002 | Dakss | G06F 17/30855 725/37 |
| 2008/0295040 A1 | * | 11/2008 | Crinon | H04N 7/152 715/865 |

FOREIGN PATENT DOCUMENTS

| JP | 2003-284010 A | 10/2003 |
| JP | 2004-040455 A | 2/2004 |

(Continued)

OTHER PUBLICATIONS

International Search Report for International Application No. PCT/KR2012/003837.

*Primary Examiner* — Jeffery Williams
(74) *Attorney, Agent, or Firm* — LRK Patent Law Firm (57) ABSTRACT

A video synchronization apparatus and method by adding sync data to an ancillary data space of a video signal are provided. A sync data adding apparatus may include a sync data generator to generate sync data; and a sync data adder to add the sync data to an ancillary data space of a video signal.

3 Claims, 8 Drawing Sheets (51) Int. Cl.
*H04N 5/067* (2006.01)
*H04N 21/235* (2011.01)
*H04N 21/2365* (2011.01)
*H04N 21/242* (2011.01)
*H04N 21/81* (2011.01)

(52) U.S. Cl.
CPC ....... *H04N 21/2365* (2013.01); *H04N 21/242* (2013.01); *H04N 21/816* (2013.01)

(58) Field of Classification Search
USPC .................................................. 375/240.01
See application file for complete search history.

(56) References Cited

FOREIGN PATENT DOCUMENTS

| | | |
|---|---|---|
| KR | 10-2005-0014945 A | 2/2005 |
| KR | 20100086440 A | 7/2010 |

\* cited by examiner

```
video_sequence() {
  next_start_code()
  sequence_h ader()
  if(nextbits()== e tension_start_code) {
    sequen e_extension()
    do {
      extension_and_user_data(0)
      do {
        If (nextbits()== group_start_cod ) {
          group_of_pictures_header()
          extension_and_user_data (1)
        }
        picture_header()
        picture_coding_extension ()
        extension_and_user_data(2)      ~610
        picture_data ()
      } while((nextbits()==picture_start_code) || (nextbits() == group_start_code) )
      if( (nextbits)!= sequence_end_code) {
        sequence_header()
        sequence_extension()
      }
    } while (nextbits() != sequence_end_code)
  } else {
    /* ISO/IEC 11172-2 */
  }
  seqeunce_end_code
}
```

FIG. 7

| |
|---|
| extension_and_user_data(i) { |
| while ( ( ( i!=1) && (nextbits()==extension_start_code) \|\|     (nextbits() == user_data_start_code ) ) { |
|   if( (nextbits)!= extension_start_code) |
|     extension_data(i) |
|   if((nextbits)!= user_data_start_code) |
|     user_data()  ~710 |
| } |
| } |

FIG. 8

| SYNTAX |
|---|
| user_data{ |
| user_data_start_code |
| ATSC_identifier |
| user_data_type_code |
| if(user_data_type_code =='0x03') |
| cc_data() |
| else if(user_data_type_code =='0x06') |
| bar_data() |
| else if(user_data_type_code =='0x07') ~820 |
| time_code() ~810 |
| else { |
| while (nextbits() != '0000 0000 0000 0000 0000 0001') { |
| ATSC_reserved_user_data |
| } |
| next_start_code() |
| } |

FIG. 10

APPARATUS AND METHOD FOR ADDING SYNCHRONIZATION INFORMATION TO AN AUXILIARY DATA SPACE IN A VIDEO SIGNAL AND SYNCHRONIZING A VIDEO

TECHNICAL FIELD

The present invention relates to a video synchronization apparatus and method by adding synchronization data (sync data) to an ancillary data space of a video signal, and more particularly, to a sync data adding apparatus and method in which a decoding apparatus may synchronize images corresponding to a video signal without a need to transmit a separate synchronization signal, or to perform a separate synchronization process by adding sync data to an ancillary data space included in a video signal.

BACKGROUND ART

When storing or encoding and decoding a plurality of related images such as a three-dimensional (3D) image, a free view image, a multi-view image, and images obtained by dividing a super resolution image corresponding to four to 16 folds of a high-definition (HD) class based on an HD class and the like, the related images may need to be synchronized based on a frame unit. Accordingly, when obtaining a plurality of related images, a gen-lock technology of unifying synchronization signals of the respective equipment and thereby synchronizing images output from the respective equipment by connecting a synchronization signal output from a separate synchronization signal generator to equipment associated with an image has been employed.

However, the gen-lock technology synchronizes a plurality of pieces of equipment and thus, may not be applicable when sequentially encoding a plurality of images using a single encoding apparatus.

Also, when encoding a plurality of images using a plurality of encoding apparatuses that employs different standards, a synchronization signal may not be exchanged between the plurality of encoding apparatuses and thus, it may be impossible to perform a synchronization using gen-lock.

Accordingly, there is a desire for a method that may synchronize images even though image synchronization using gen-lock is impossible.

DISCLOSURE OF INVENTION

Technical Goals

An aspect of the present invention provides an apparatus and method in which a decoding apparatus may synchronize images corresponding to a video signal without a need to transmit a separate synchronization signal, or to perform a separate synchronization process.

Another aspect of the present invention provides an apparatus and method that enables a terminal receiving bitstreams to synchronize and play back the bitstreams without a need to synchronize and thereby multiplex the bitstreams.

Another aspect of the present invention also provides an apparatus and method that may perform synchronization even though bitstreams to be synchronized are not received at the same time.

Technical Solutions

According to an aspect of the present invention, there is provided an apparatus for adding synchronization data (sync data), the apparatus including: a sync data generator to generate sync data; and a sync data adder to add the sync data to an ancillary data space of a video signal.

According to another aspect of the present invention, there is provided an encoding system, including: a sync data adding apparatus to add sync data to an ancillary data space of a video signal; and an encoding apparatus to generate a bitstream in which the sync data is added by encoding the video signal in which the synch data is added.

The encoding apparatus may identify the sync data in the ancillary data space of the video signal, and may add the identified sync data to a user data syntax among syntaxes of the bitstream.

The encoding system may further include a multiplexing apparatus to synchronize a plurality of bitstreams based on the sync data included in the bitstream, and multiplexes the synchronized bitstreams.

The multiplexing apparatus may determine an interval for verifying the sync data based on the user data syntax added with the sync data, and may synchronize the plurality of bitstreams by verifying the sync data at the determined intervals.

According to still another aspect of the present invention, there is provided an encoding system, including: a caption data adding apparatus to add, to an ancillary data space of a video signal, caption data that includes sync data; an encoding apparatus to generate a bitstream by encoding the video signal in which the caption data is added; and a multiplexing apparatus to synchronize and thereby multiplex a plurality of bitstreams based on the sync data included in the caption data of the bitstream.

The encoding apparatus may identify the sync data included in the caption data, and may add the identified sync data to a syntax associated with the caption data in the bitstream.

According to yet another aspect of the present invention, there is provided a method of adding sync data, the method including: generating sync data; and adding the sync data to an ancillary data space of a video signal.

According to a further another aspect of the present invention, there is provided an encoding method, including: adding sync data to an ancillary data space of a video signal; and generating a bitstream in which the sync data is added by encoding the video signal in which the synch data is added.

According to still another aspect of the present invention, there is provided an encoding method, including: adding, to an ancillary data space of a video signal, caption data that includes sync data; generating a bitstream by encoding the video signal in which the caption data is added; and synchronizing and thereby multiplexing a plurality of bitstreams based on the sync data included in the caption data of the bitstream.

Effect of the Invention

According to embodiments of the present invention, by adding synchronization data (sync data) to an ancillary data space included in a video signal, a decoding apparatus may synchronize images corresponding to the video signal without a need to transmit a separate synchronization signal, or to perform a separate synchronization process.

Also, according to embodiments of the present invention, by encoding sync data included in a video signal together with the video signal to thereby generate a bitstream, even though a plurality of bitstreams is transmitted without a synchronization process, a terminal receiving bitstreams may synchronize and play back the plurality of bitstreams.

Also, according to embodiments of the present invention, bitstreams to be synchronized may be retrieved and thereby be synchronized based on sync data included in a bitstream. Accordingly, even though the bitstreams to be synchronized are not simultaneously received, it is possible to retrieve and synchronize a bitstream to be synchronized from among initially received bitstreams.

BEST MODE FOR CARRYING OUT THE INVENTION

Reference will now be made in detail to embodiments of the present invention, examples of which are illustrated in the accompanying drawings, wherein like reference numerals refer to the like elements throughout. The embodiments are described below in order to explain the present invention by referring to the figures. A synchronization data (sync data) adding method according to an embodiment of the present invention may be performed by a sync data adding apparatus.

Figure 1:
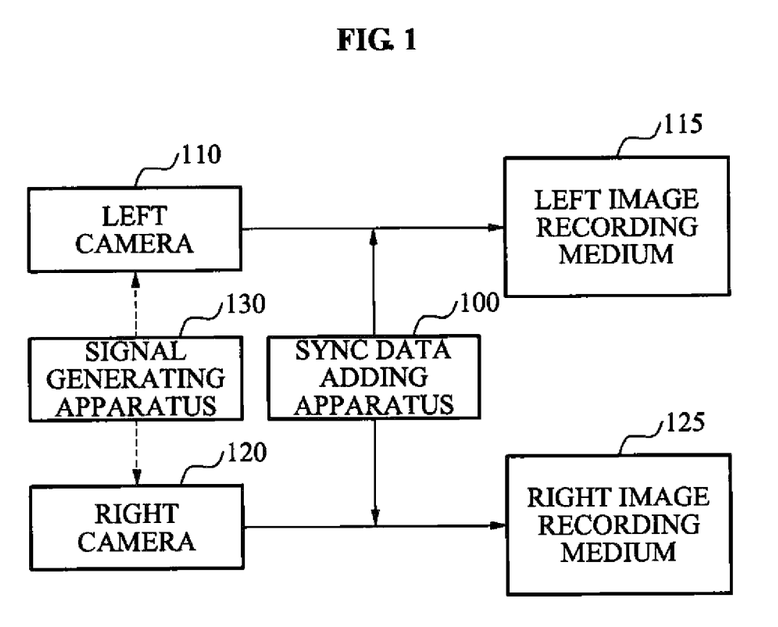
FIG. 1 is a diagram illustrating a relationship between a synchronization data (sync data) adding apparatus and other apparatuses according to an embodiment of the present invention.

FIG. 1 is a diagram illustrating an image obtaining system including a sync data adding apparatus according to an embodiment of the present invention.

Referring to FIG. 1, the image obtaining system may include a sync data adding apparatus 100, a left camera 110, a left image recording medium 115, a right camera 120, a right image recording medium 125, and a signal generating apparatus 130.

The left camera 110 may generate a first video signal that is a video signal of a left image by photographing a left image of a photographing target, and may transmit the first video signal to the sync data adding apparatus 100.

The right camera 120 may generate a second video signal that is a video signal of a right image by photographing a right image of the photographing target, and may transmit the second video signal to the sync data adding apparatus 100.

Here, the left camera 110 and the right camera 120 may be gen-locked by the signal generating apparatus 130, and may simultaneously transmit the first video signal and the second video signal based on a synchronization signal of the signal generating apparatus 130.

The sync data adding apparatus 100 may generate sync data, and may add the sync data to an ancillary data space of the first video signal and an ancillary data space of the second video signal. Here, the sync data may be information required to synchronize the left image and the right image such as a time code. Also, the ancillary data space may be one of a vertical ancillary data space (VANC) positioned between video frames of the video signal and a data space for transmission at a vertical blanking interval (VBI).

Here, the sync data adding apparatus 100 may transmit the first video signal and the second video signal in which the sync data is added, to the left image recording medium 115 and the right image recording medium 125, respectively, and thereby store the first video signal and the second video signal therein.

The sync data adding apparatus 100 may generate sync data using at least a predetermined number of bits such as a time code that includes hour data, minute data, and second data, and thereby prevent the same synchronization signal from being overlappingly added in single video content or a connected video sequence.

Also, as shown in FIG. 1, the sync data adding apparatus 100 may generate sync data, and may add the sync data to ancillary data spaces of a plurality of video signals in all the interface standards associated with broadcasting and an image in addition to a video signal for a three-dimensional (3D) image, and thereby enables the sync data to be available as necessary. Here, the plurality of video signals to which the sync data adding apparatus 100 adds sync data may be video signals of images that are associated with each other and thereby are required to be synchronized, such as a 3D image, a free-view image, a multi-view image, and images obtained by dividing a super resolution image.

That is, the sync data adding apparatus 100 may add sync data to an ancillary data space included in a video signal. Through this, a decoding apparatus may synchronize images corresponding to the video signal without a need to transmit a separate synchronization signal, or to performing a separate synchronization process.

Figure 2:
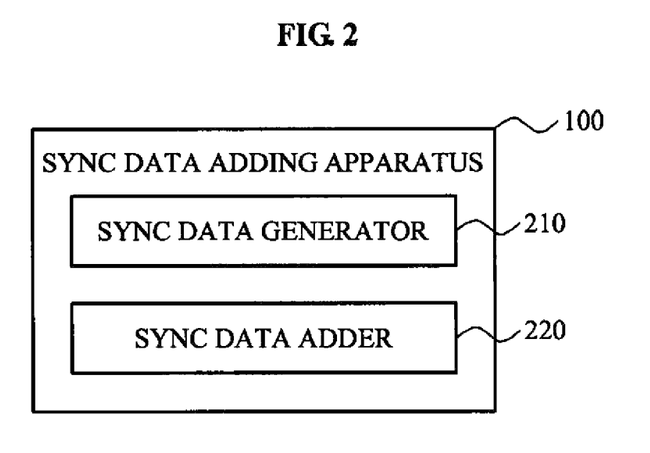
FIG. 2 is a block diagram illustrating a sync data adding apparatus according to an embodiment of the present invention.

FIG. 2 is a block diagram illustrating the sync data adding apparatus 100 according to an embodiment of the present invention.

Referring to FIG. 2, the sync data adding apparatus 100 may include a sync data generator 210 and a sync data adder 220.

The sync data generator 210 may generate sync data by including a time code based on a time when a video signal is received, or a playback time of a video frame. Here, the sync data generator 210 may generate sync data using at least a predetermined number of bits such as a time code that includes hour data, minute data, and second data, and thereby prevent the same synchronization signal from being overlappingly added in single video content or a connected video sequence.

The sync data adder 220 may add, to the ancillary data space of the video signal, the sync data that is generated by the sync data generator 210. Here, the sync data adder 220 may determine, as the ancillary data space, one of a VANC, a data space for transmission at a VBI, and ab ancillary data space positioned between video frames of a video signal in national television system committee (NTSC), SD-serial digital interface (SDI), and HD-SDI standards, and may add sync data to the data space that is determined as the ancillary data space.

The ancillary data space will be further described with reference to FIG. 3.

Figure 3:
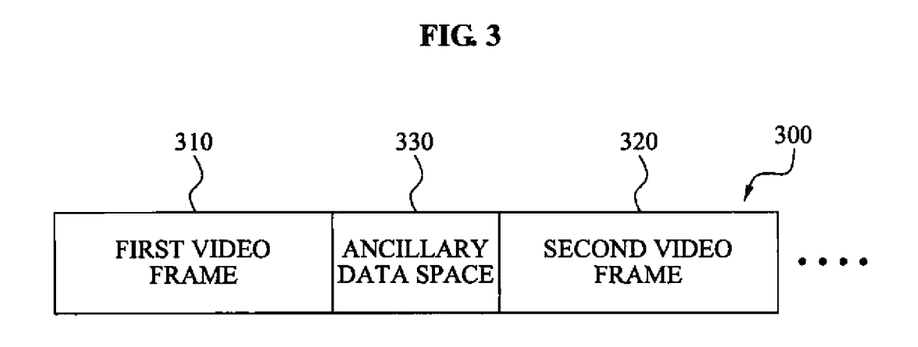
FIG. 3 is a diagram illustrating an example of an ancillary data space to which a sync data adding apparatus adds sync data according to an embodiment of the present invention.

FIG. 3 is a diagram illustrating an example of an ancillary data space to which a sync data adding apparatus adds sync data according to an embodiment of the present invention.

An image display apparatus may use a time for resetting or setting an image display function in order to display a subsequent screen after displaying a single screen. Here, the image display apparatus may not use the image display function and thus, a data received at the above point in time may not be displayed on a screen.

Accordingly, as shown in FIG. 3, a video signal 300 of an image may include an ancillary data space 330 between a first video frame 310 for displaying a single screen and a second video frame 320 for displaying a subsequent screen.

By adding sync data to the ancillary data space 330 included in the video signal 300, the sync data adding apparatus 100 may transmit information used to synchronize a video signal without a need to transmit a separate synchronization signal or additional information.

Figure 4:
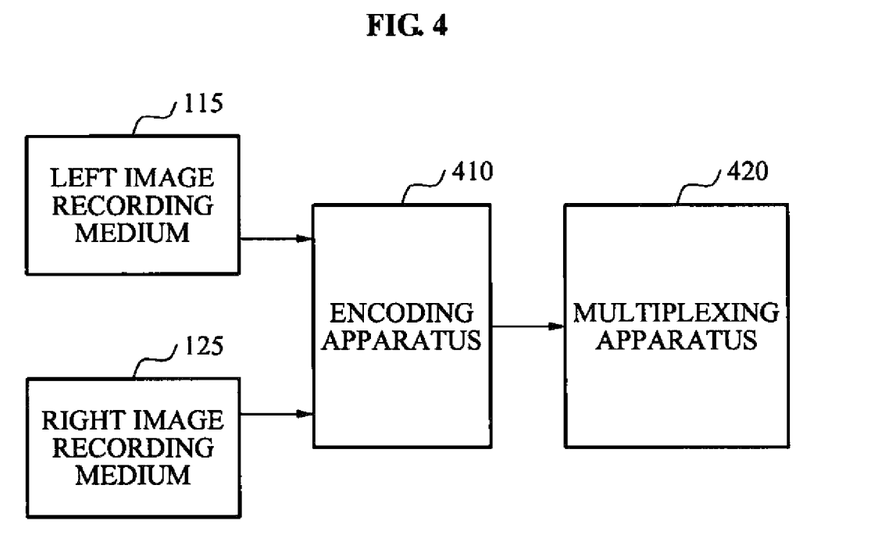
FIG. 4 is a block diagram illustrating an example of a system for encoding a video signal according to an embodiment of the present invention.

FIG. 4 is a block diagram illustrating an example of a system for encoding a video signal according to an embodiment of the present invention.

An encoding apparatus 410 may receive, from the left image recording medium 115, a first video signal in which sync data is added, and may receive, from the right image recording medium 125, a second video signal in which sync data is added, and thereby encode the first video signal and the second video signal based on a frame unit.

Specifically, the encoding apparatus 410 may identify the sync data in the ancillary data space of the video signal, and may divide the video signal based on a frame unit.

Next, the encoding apparatus 410 may generate a bitstream by encoding the video signal divided based on the frame unit together with sync data corresponding to a corresponding frame. Here, the encoding apparatus 410 may store sync data in an elementary stream (ES) of a bitstream. Also, the encoding apparatus 410 may additionally define flag information indicating whether sync data is present in a transport stream (TS) syntax, so that a multiplexing apparatus 420 may readily verify whether the sync data is present.

A next generation digital broadcasting, such as a 3DTV, a free view broadcasting, a multi-view broadcasting, a super resolution TV, and the like, may need to maintain the compatibility with an existing desktop video (DTV) broadcasting.

That is, when at least one of a plurality of video signals is generated as a bitstream according to an advanced television systems committee (ATSC) digital broadcasting standard used in the existing DTV broadcasting, the encoding apparatus 410 may maintain the compatibility with the existing DTV broadcasting. A method of adding, by the encoding apparatus 410, sync data to a bitstream according to an ATSC digital broadcasting standard will be described with reference to FIGS. 6 through 8.

The encoding apparatus 410 may transmit the generated bitstream to the multiplexing apparatus 420.

The encoding apparatus 410 may generate a bitstream by encoding a video signal and sync data included in the video signal. Through this, without a need to synchronize and multiplex bitstreams using the multiplexing apparatus 420, a terminal receiving a bitstream may synchronize and thereby play back the plurality of bitstreams. For example, as in a non-real time (NRT) 3D broadcasting, even though a left image signal and a right image signal are separately transmitted without being multiplexed, a terminal receiving a signal may synchronize and thereby play back the left image signal and the right image signal using sync data included in the signals.

The multiplexing apparatus 420 may synchronize and thereby multiplex a plurality of bitstreams based on sync data that is included in a bitstream received from the encoding apparatus 410.

Specifically, the multiplexing apparatus 420 may identify sync data of each frame by interpreting an ES syntax of the bitstream that is received from the encoding apparatus 410.

Next, the multiplexing apparatus 420 may search for a frame of another bitstream having the same sync data as the identified sync data.

Next, the multiplexing apparatus 420 may synchronize a frame of the bitstream retrieved based on the sync data with a frame of the received bitstream.

The multiplexing apparatus 420 may multiplex and thereby output the synchronized bitstreams.

A conventional multiplexing apparatus needs to receive bitstreams that are to be synchronized and be multiplexed at the same time and thus, the number of encoding apparatuses corresponding to the number of bitstreams to be multiplexed may be required. For example, as shown in FIG. 4, to multiplex bitstreams in which a left image and a right image are encoded, respectively, the left image and the right image may be simultaneously encoded using two encoding apparatuses, and the bitstream of the left image and the bitstream of the right image may need to be received from the two encoding apparatuses and be multiplexed at the same time.

On the other hand, the multiplexing apparatus 420 according to the present invention may need to search for and synchronize bitstreams to be synchronized based on sync data included in a bitstream. Accordingly, even though bitstreams to be synchronized are not received at the same time, the encoding apparatus 420 may search for and thereby multiplex a bitstream having the same bit data from among initially received bitstreams. Accordingly, regardless of the number of encoding apparatuses, the multiplexing apparatus 420 according to the present invention may synchronize and multiplex a plurality of bitstreams.

For example, as shown in FIG. 4, the multiplexing apparatus 420 may generate a plurality of bitstreams by sequentially encoding a plurality of video signals using a single encoding apparatus 410, and may store bitstreams that are received from the encoding apparatus 410. When encoding of the images is completed, the multiplexing apparatus 420 may synchronize the plurality of stored bitstreams using sync data that is included in the plurality of bitstreams.

Also, a decoding apparatus according to the present invention may decode a received bitstream, and may synchronize the decoded bitstream using the same method as the multiplexing apparatus 420.

Specifically, the decoding apparatus may identify sync data of each frame by interpreting an ES syntax of the decoded bitstream.

Next, the decoding apparatus may search for a frame of another bitstream having the same sync data as the identified sync data.

Next, the decoding apparatus may synchronize a frame of the bitstream retrieved based on the sync data with a frame of the received bitstream.

Figure 5:
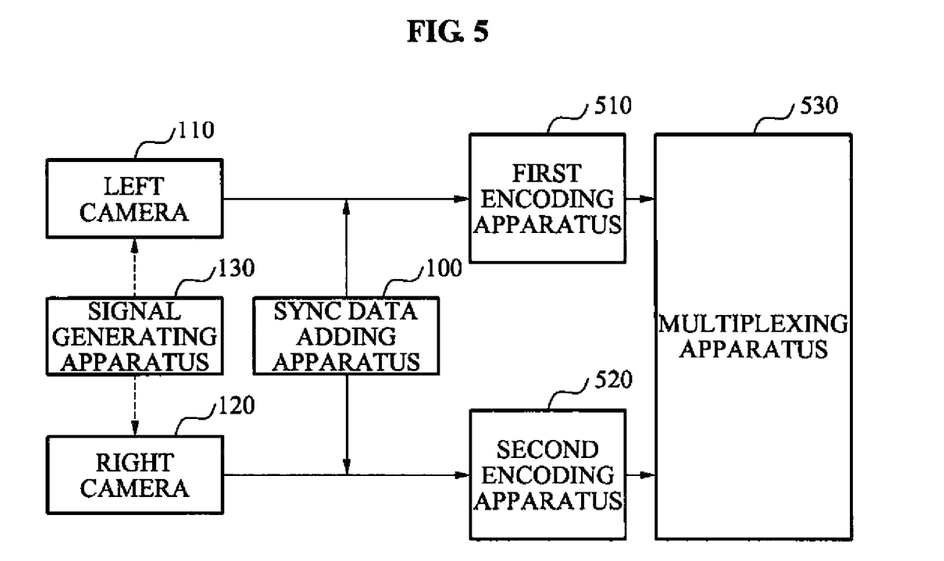
FIG. 5 is a block diagram illustrating an example of an encoding system including a sync data adding apparatus according to an embodiment of the present invention.

FIG. 5 is a block diagram illustrating an example of an encoding system including a sync data adding apparatus according to an embodiment of the present invention.

Referring to FIG. 5, the encoding system may include a sync data adding apparatus 100, a left camera 110, a right camera 120, a signal generating apparatus 130, a first encoding apparatus 510, a second encoding apparatus 520, and a multiplexing apparatus 530. Here, the left camera 110, the right camera 120, and the signal generating apparatus 130 may perform the same functionality as described above with reference to FIG. 1 and thus, a further detailed description will be omitted here.

The sync data adding apparatus 100 may generate sync data, may add the sync data to an ancillary data space of a first video signal that is received from the left camera 110, and may transmit the first video signal to the first encoding apparatus 510. Also, the sync data adding apparatus 100 may add the sync data to an ancillary data space of a second video signal that is received from the right camera 120, and may transmit the second video signal to the second encoding apparatus 520.

The first encoding apparatus 510 may generate a first bitstream by encoding, based on a frame unit, the first video signal that is received from the sync data adding apparatus 100. Here, the first encoding apparatus 510 may identify the sync data from the ancillary data space of the first video signal, and may add the identified sync data to a user data syntax among syntaxes of the first bitstream. The first encoding apparatus 510 may transmit, to the multiplexing apparatus 530, the first bitstream in which the sync data is added.

The second encoding apparatus 520 may generate a second bitstream by encoding, based on a frame unit, the second video signal that is received from the sync data adding apparatus 100. Here, the second encoding apparatus 520 may identify the sync data from the ancillary data space of the second video signal, and may add the identified sync data to, a user data syntax among syntaxes of the second bitstream. The second encoding apparatus 520 may transmit, to the multiplexing apparatus 530, the second bitstream in which the sync data is added.

The multiplexing apparatus 530 may synchronize and multiplex a frame in which the same sync data is added to the first bitstream and the second bitstream, based on the sync data that is included in each of the first bitstream and the second bitstream.

Figure 6:
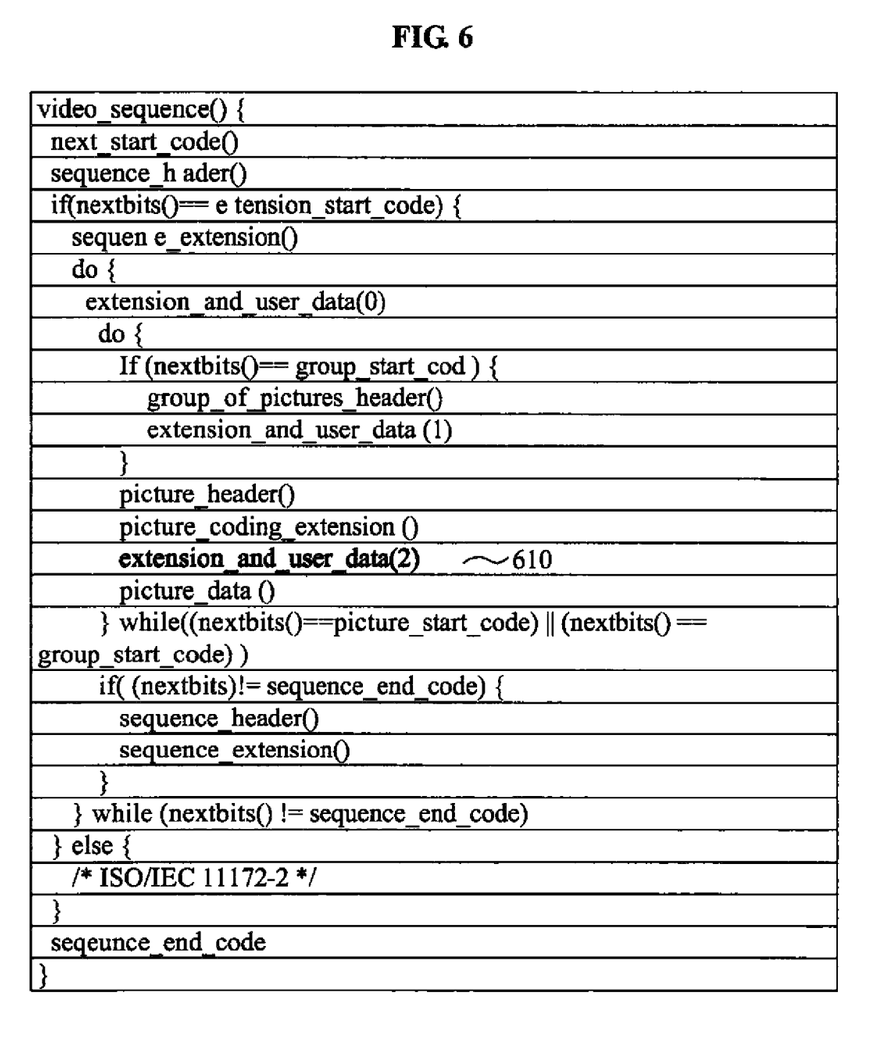
FIG. 6 illustrates an example of top syntax of a bitstream generated by an encoding apparatus according to an embodiment of the present invention.

FIG. 6 illustrates an example of top syntax of a bitstream generated by an encoding apparatus according to an embodiment of the present invention.

An ATSC digital broadcasting standard encodes a video signal using an MPEG-2 video encoding standard. Therefore, video sequence( ) that is a top syntax of MPEG-2 bitstream generated by the encoding apparatus 410 according to the ATSC digital broadcasting standard may include extension_and_user_data(2) 610.

Also, the encoding apparatus 410 may include extension_and_user_data(1) in video sequence( ), instead of including extension_and_user_data(2) 610.

Here, in extension_and_user_data(1), ancillary data may be inserted based on a group of pictures (GOP). In extension_and_user_data(2), ancillary data may be inserted into an encoded bitstream based on a picture unit. Also, the GOP unit may include an encoded picture of a plurality of frames and thus, be a randomly accessible independent encoding unit. The picture may be an image in which each video frame is encoded. A plurality of frames corresponding to the GOP unit may include frames from a single key frame to a subsequent key frame.

Figure 7:
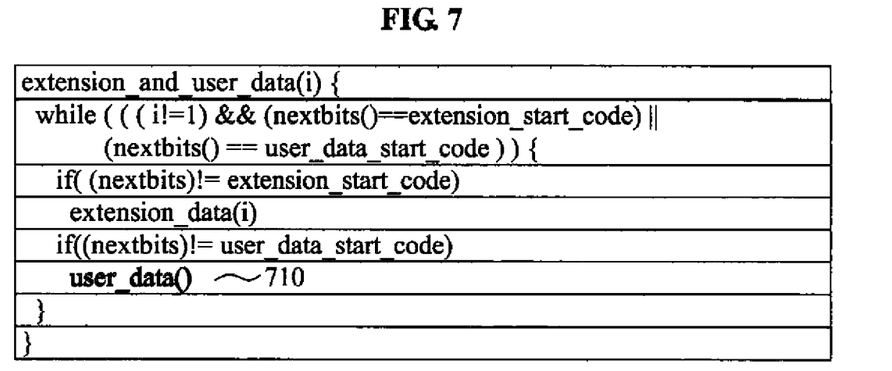
FIG. 7 illustrates an example of syntax capable of being inserted with ancillary data in a bitstream generated by an encoding apparatus according to an embodiment of the present invention.

As shown in FIG. 7, extension_and_user_data(1) or extension_and_user_data(2) may include user_data( ) 710. Here, in FIG. 7, i may be either 1 or 2.

The encoding apparatus 410 may store sync data in user_data( ) 710 that is included in extension_and_user_data (1) or extension_and_user_data(2).

For example, when the sync data adding apparatus 100 generates sync data using a time code that is indicated as hour, minute, second, and the number of frames, the encoding apparatus 410 may store sync data in user_data( ) 710 based on a time code syntax according to society of motion picture and television engineers (SMPTE) 334-2: caption distribution packet definition standard, as shown in the following Table 1:

TABLE 1

| Syntax | Bits | Meaning |
| --- | --- | --- |
| time_code( ){ | | |
|   tc_10hrs | 2 | Value of ten hour unit |
|   tc_1hrs | 4 | value of one hour unit |
|   Reserved | 1 | '1' |
|   tc_10min | 3 | Value of ten minute unit |
|   tc_1min | 4 | Value of one minute unit |
|   tc_feld_flag | 1 | In an interlace picture, set as zero if it is a first field, and set as '1' if it is a second filed. In a progressive picture, used for counting the number of frames. That is, interpreted as (2*frame + flag). |
|   tc_10sec | 3 | Value of ten minute second |
|   tc_1sec | 4 | Value of one minute second |
|   drop_frame_flag | 1 | When time code count compensates for drop-frame, it is indicated as 1 and otherwise, it is indicated as zero. |
|   zero | 1 | '0' |
|   tc_10fr | 3 | Counted value of ten frame unit |
|   tc_1fr | 4 | Counted value of one frame unit. |
|   } | | |
| } | | |

When the multiplexing apparatus 420 multiplexes, to a single MPEG-2 TS, bitstreams that are received from the plurality of encoding apparatuses 410, or bitstreams that are received from a single encoding apparatus 410, the multiplexing apparatus 420 may multiplex the bitstreams using sync data that is stored in user_data( ) 710.

Here, the multiplexing apparatus 420 may determine an interval for verifying sync data based on the user data syntax in which the sync data is added, and may synchronize the plurality of bitstreams by verifying the sync data at the determined intervals. For example, when the sync data is stored in user_data( ) 710 of extension_and_user_data(1), the multiplexing apparatus 420 may perform multiplexing by verifying the sync data based on a GOP unit. Also, when the sync data is stored in user_data( ) 710 of extension_and_user_data(2), the multiplexing apparatus 420 may perform multiplexing by verifying the sync data based on a picture unit.

Also, extension_and_user_data(1) or extension_and_user_data(2) may be a syntax for storing ancillary data instead of image information. Accordingly, even though a decoding apparatus that receives and decodes a signal output from the multiplexing apparatus 420 is incapable of interpreting the sync data that is stored in user_data( ) 710 of extension_and_user_data(2), the decoding apparatus may restore an image by decoding the syntax in which the image information is encoded. That is, even a conventional decoding apparatus incapable of identifying sync data may restore an image of an encoded signal according to the present invention and thus, the encoding system according to the present invention may be compatible with the conventional decoding apparatus.

Figure 8:
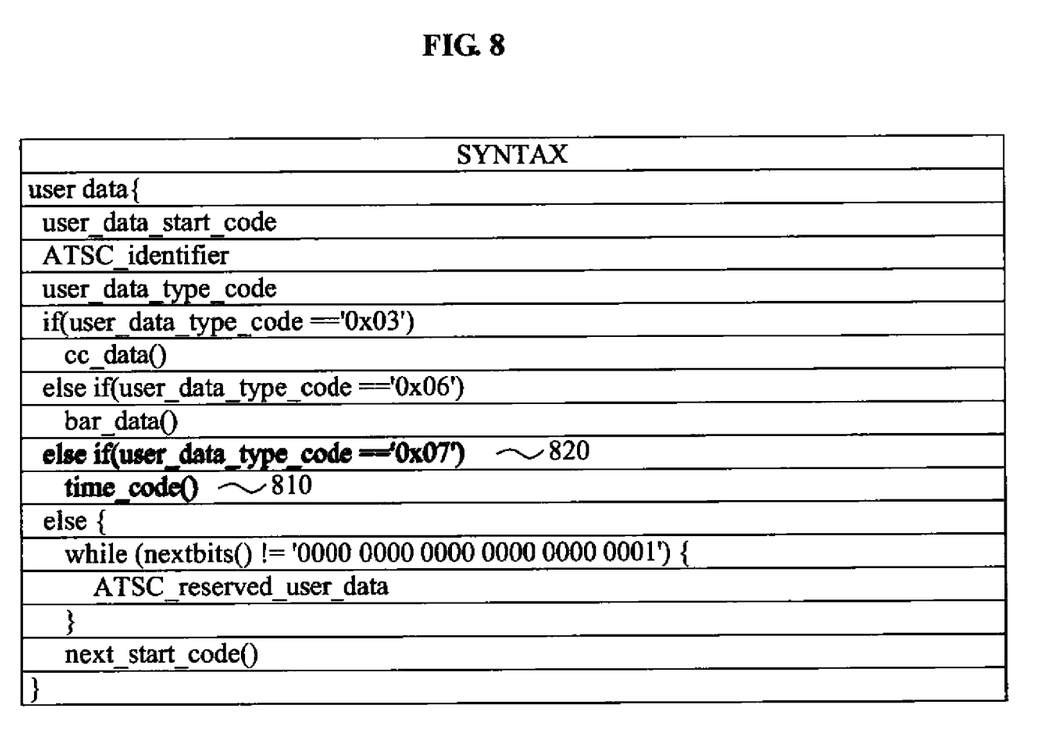
FIG. 8 illustrates an example of user data syntax associated with a caption in a bitstream generated by an encoding apparatus according to an embodiment of the present invention.

FIG. 8 illustrates an example of user data syntax associated with a caption in a bitstream generated by an encoding apparatus according to an embodiment of the present invention.

An ATSC digital broadcasting standard defines a picture user data syntax that indicates closed caption data or bar data in user_data( ) of an MPEG-2 video encoded bitstream.

The encoding apparatus 410 according to the present invention may transmit sync data according to the ATSC digital broadcasting standard by adding time code( ) 810 of table 1 to picture user data syntax of user data( ) 710. Here, a syntax 820 associated with user_data_type_code may be one of ATSC_reserved_user_data, and may be a conditional syntax for identifying time code( ) 810.

Figure 9:
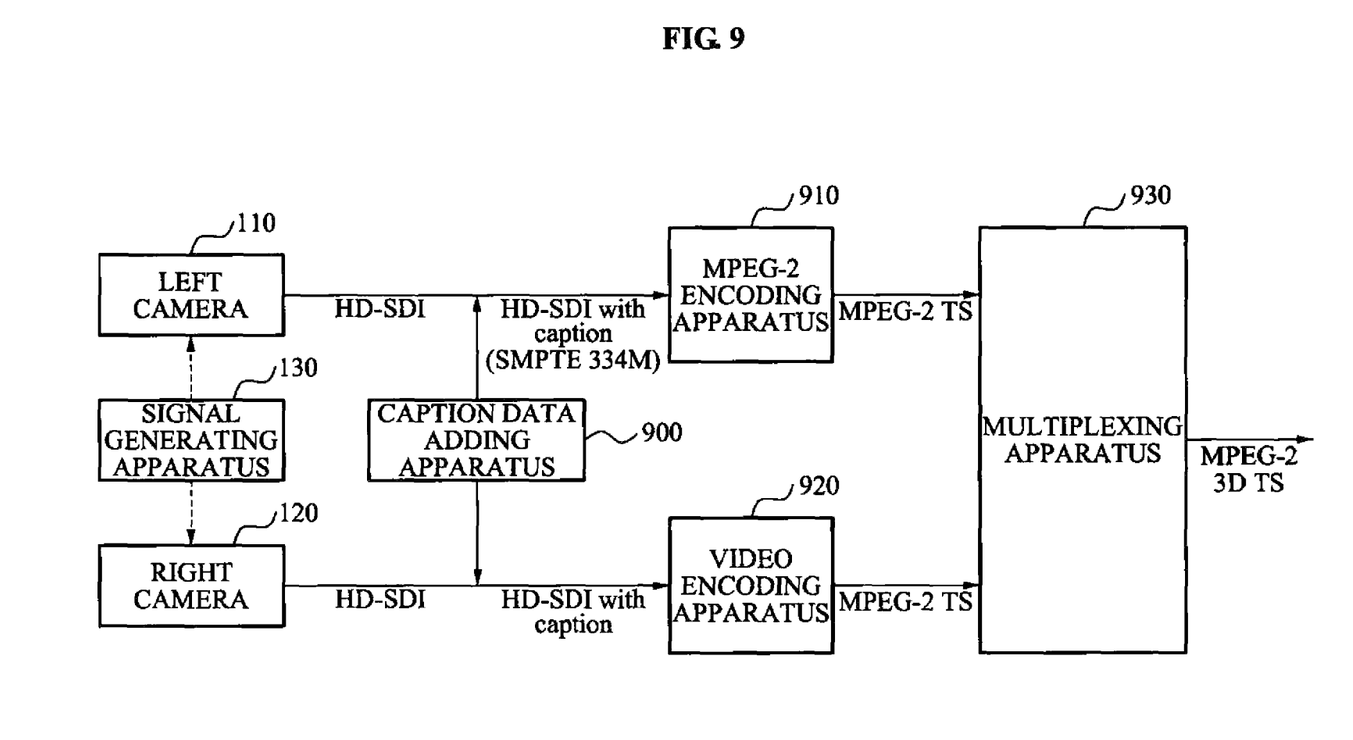
FIG. 9 is a block diagram illustrating an example of a binocular three-dimensional (3D) television (TV) including a sync data adding apparatus according to an embodiment of the present invention.

FIG. 9 is a block diagram illustrating an example of a binocular 3DTV transmitting system that includes a caption data adding apparatus according to an embodiment of the present invention.

FIG. 9 shows an example in which a sync data adding function according to an embodiment of the present invention is added to the caption data adding apparatus of the binocular 3DTV transmitting system based on a conventional MPEG-2 encoding apparatus and a heterogeneous codec encoding apparatus. Here, a left camera 110, a right camera 120, and a signal generating apparatus 130 may perform the same functionality as described above with reference to FIG. 1 and thus, a further detailed description will be omitted here.

A caption data adding apparatus 900 may generate sync data and caption data associated with an image photographed from the left camera 110 and the right camera 120, and may add the caption data including the sync data to an ancillary data space of a first video signal and an ancillary data space of a second video signal. Here, the caption data adding apparatus 900 may generate caption data, for example, closed caption using SMPTE 333M or SMPTE 334M that are standards with respect to EIA-608 (analog and SD-SDI closed captioning) and EIA-708 (HD-SDI closed captioning).

An MPEG-2 encoding apparatus 910 may encode caption data together with a video signal, and may output the same to an MPEG-2 TS.

Here, the MPEG-2 encoding apparatus 910 may not generate a bitstream by inserting sync data in user_data( ) within extension_and_user_data(1) or extension_and_user_data(2). Accordingly, the MPEG-2 encoding apparatus 910 may store the sync data by adding time code( ) 810 to cc_data( ) that indicates a position of caption broadcasting data pair.

When using an MPEG-2 encoding method, the video encoding apparatus 920 may encode the video signal and the caption and thereby output the same to an MPEG-2 TS. Here, the video encoding apparatus 920 may store the sync data by adding time code( ) 810 to cc_data( ).

Also, when using an advanced video coding (AVC) or high efficiency video coding (HEVC) based encoding method, the video encoding apparatus 920 may generate a bitstream by encoding caption data based on a frame unit. Here, the video encoding apparatus 920 may identify the sync data from the ancillary data space of the second video signal, and may add the identified sync data to a user data syntax among syntaxes of the second bitstream. The video encoding apparatus 920 may transmit, to the multiplexing apparatus 930, the bitstream in which the sync data is added.

The multiplexing apparatus 930 may identify sync data of each frame by verifying cc_data( ) of MPEG-2 TS that is received from the MPEG-2 encoding apparatus 910 and user_data( ) of a bitstream that is received from the video encoding apparatus 920, and may synchronize and thereby multiplex the MPEG-2 TS received from the MPEG-2 encoding apparatus 910 and the bitstream received from the video encoding apparatus 920. Through this, the multiplexing apparatus 930 may generate and output an MPEG-2 3D TV TS signal about 3D TV broadcasting content.

Figure 10:
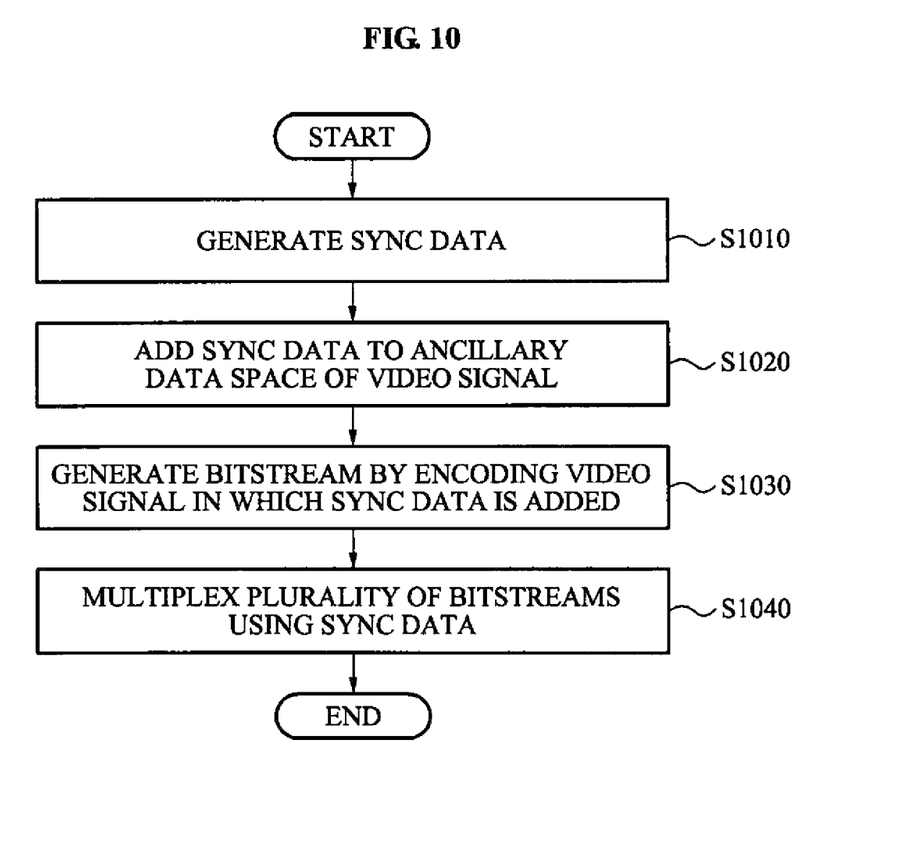
FIG. 10 is a flowchart illustrating a sync data adding method according to an embodiment of the present invention.

FIG. 10 is a flowchart illustrating a sync data adding method according to an embodiment of the present invention.

In operation S1010, the sync data adding apparatus 100 may generate sync data including a time code based on a time when a video signal is received, or a playback time of a video frame.

In operation S1020, the sync data adding apparatus 100 may add the generated sync data to an ancillary data space of the video signal.

In operation S1030, the sync data adding apparatus 100 may generate a bitstream by encoding the video signal in which the sync data is added, based on a frame unit.

Specifically, the encoding apparatus 410 may generate a bitstream by identifying the sync data from the ancillary data space of the video signal, and by encoding the video signal divided based on a frame unit together with sync data corresponding to a corresponding frame.

In operation S1040, the multiplexing apparatus 420 may synchronize and thereby multiplex a plurality of bitstreams based on the sync data that is included in the bitstream generated in operation S1030.

Specifically, in operation S1030, the multiplexing apparatus 420 may identify sync data of a bitstream and may search for another bitstream having the same sync data as the identified sync data. Next, the multiplexing apparatus 420 may synchronize and thereby multiplex a frame of the bitstream retrieved based on the sync data with a frame of the bitstream generated in operation S1020.

According to embodiments of the present invention, by adding sync data in an ancillary data space of a video signal, a decoding apparatus may synchronize images corresponding to the video signal without a need to transmit a separate synchronization signal or performing a separate synchronization process.

According to embodiments of the present invention, it is possible to generate a bitstream by encoding a video signal and sync data included in the video signal. Therefore, even though a plurality of bitstreams is transmitted without a synchronization process, a terminal receiving the bitstream may synchronize and play back the plurality of bitstreams.

According to embodiments of the present invention, bitstreams to be synchronized may be retrieved and be synchronized based on sync data included in a bitstream. Accordingly, even though bitstreams to be synchronized are not simultaneously received, it is possible to retrieve and synchronize a bitstream to be synchronized among initially received bitstreams.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. An encoding system, comprising:
a sync data adding apparatus to add sync data to an ancillary data space of a video signal;
an encoding apparatus to generate a bitstream in which the sync data is added by encoding the video signal in which the synch data is added; and
a multiplexing apparatus to synchronize a plurality of bitstreams based on the sync data included in the bitstream, and multiplexes the synchronized bitstreams,
wherein the encoding apparatus identifies the sync data in the ancillary data space of the video signal, and adds the identified sync data to a user data syntax among syntaxes of the bitstream, and
wherein the multiplexing apparatus determines an interval for verifying the sync data based on the user data syntax added with the sync data, and synchronizes the plurality of bitstreams by verifying the sync data at the determined intervals.

2. An encoding method, comprising:
adding sync data related to time information to an ancillary data space of a video signal; and
generating an MPEG-2 bitstream by encoding the video data using MPEG-2 video encoding scheme,
wherein the MPEG-2 bitstream includes video sequence( ) syntax,
wherein the video sequence( ) syntax includes the ancillary data corresponding to extension_and_user_data( ) syntax inserted in the MPEG-2 bitstream, based on a group of pictures (GOP) of the video data, or a picture unit.

3. An encoding method, comprising:
adding sync data to an ancillary data space of a video signal;
generating a bitstream in which the sync data is added by encoding the video signal in which the synch data is added;
synchronizing a plurality of bitstreams based on the sync data included in the bitstream; and
multiplexing the synchronized bitstreams,
wherein the generating comprises identifying the sync data in the ancillary data space of the video signal, and adding the identified sync data to a user data syntax among syntaxes of the bitstream, and
wherein the synchronizing comprises determining an interval for verifying the sync data based on the user data syntax added with the sync data, and synchronizing the plurality of bitstreams by verifying the sync data at the determined intervals.

* * * * *